United States Patent
Aplin et al.

(10) Patent No.: US 6,657,028 B1
(45) Date of Patent: Dec. 2, 2003

(54) ANIONIC POLYMERIZATION PROCESS

(75) Inventors: J. Todd Aplin, Baton Rouge, LA (US); Charles H. Kolich, Baton Rouge, LA (US); W. Dirk Klobucar, Baton Rouge, LA (US); Kimberly A. Maxwell, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 10/211,648

(22) Filed: Aug. 1, 2002

(51) Int. Cl.$^7$ .............................. C08F 4/48; C08F 12/08
(52) U.S. Cl. ....................... 526/181; 526/88; 526/173; 526/204; 526/209; 526/346
(58) Field of Search ................................. 526/173, 181, 526/204, 209, 88, 346

(56) References Cited

U.S. PATENT DOCUMENTS

| | | |
|---|---|---|
| 3,812,088 A | 5/1974 | Bennett |
| 4,200,713 A | 4/1980 | Wingler et al. |
| 4,205,016 A | 5/1980 | Tung et al. |
| 4,948,847 A | 8/1990 | Morita et al. |
| 5,391,655 A | 2/1995 | Brandstetter et al. |
| 5,677,390 A | 10/1997 | Dadgar et al. |
| 5,681,797 A | 10/1997 | Lawate |
| 5,686,538 A | 11/1997 | Balhoff et al. |
| 5,717,040 A | 2/1998 | Brandstetter et al. |
| 5,767,203 A | 6/1998 | Ao et al. |
| 5,811,378 A | 9/1998 | Lange |
| 5,832,132 A | 11/1998 | Shimomura et al. |
| 5,852,131 A | 12/1998 | Balhoff et al. |
| 5,916,978 A | 6/1999 | Ao et al. |
| 6,117,941 A | 9/2000 | Adams et al. |
| 6,207,765 B1 | 3/2001 | Ao et al. |
| 6,265,358 B1 | 7/2001 | Luciani et al. |
| 6,288,013 B1 | 9/2001 | Sivik et al. |
| 6,300,288 B1 | 10/2001 | Scharf et al. |
| H2030 H * | 6/2002 | Hoxmeier ................... 526/181 |

FOREIGN PATENT DOCUMENTS

| | | |
|---|---|---|
| EP | 0176611 A1 | 4/1986 |
| EP | 0201411 A2 A3 | 11/1986 |
| WO | WO 0014125 A1 | 3/2000 |

OTHER PUBLICATIONS

Allen, G. et al.; "Anionic Polymerization of Styrene by Sodium Naphthalene"; Journal of Polymer Science; 1960; vol. XLVIIL; pp. 189–193.

Bikales, Norbert M. Executive Editor Consultant; "Encyclopedia of Polymer Science and Technology Plastics, Resins, Rubbers, Fibers"; 1970; John Wiley & Sons, Inc.; vol. 13; pp. 184–187.

Bywater, S. et al.; "Anionic Polymerization of Styrene Effect of Tetrahydrofuran"; Canadian Journal of Chemistry; 1962; vol. 40; pp. 1564–1570.

Bywater, S.; "Encyclopedia of Polymer Science And Engineering" 1985; John Wiley & Sons, Inc.; vol. 2; pp. 1–43.

Bywater, S. et al.; "Alkyllithium Anionic Polymerization Initiators in Hydrocarbon Solvents"; J. Organometal. Chem.; 1967; vol. 10; pp. 1–6.

Fetters, Lewis J.; "Solvent Participation in the Anionic Polymerization of Styrene"; Polymer Letters; 1964; vol. 2; pp. 425–428.

Geacintov, C. et al.; "Kinetics of Anionic Polymerization of Styrene in Tetrahydrofuran"; Anionic Polymerization of Styrene; Jul. 5, 1962; vol. 84; pp. 2508–2514.

Johnson, A.F. et al.; "Anionic Polymerization of Butadiene and Styrene"; Journal of Polymer Science Part A.; 1965; vol. 3; pp. 449–455.

Morton, Maurice et al.; "Homogeneous Anionic Polymerization. II. Molecular Weight of Polystyrene Initiated by Lithium Alkyls"; Journal of Polymer Science: Part A.; 1963; vol. 1; pp. 461–474.

Roovers, J.E.I. et al.; "The Reaction of *tert–Butyllithium* with Styrene and Isoprene. A Comparison of Chain Initiation with the Isomers of Butyllithium"; Macromolecules; May–Jun. 1975; vol. 8, No. 3; pp. 251–254.

Welch, F.J.; "Polymerization of Styrene by n–Butyllithium. II. Effect of Lewis Acids and Bases"; Polymerization of Styrene with Lewis Acids and Bases; Dec. 5, 1960; vol. 82; pp. 6000–6005.

Worsfold, D.J. et al.; "Anionic Polymerization of Styrene"; Can. J. Chem.; 1960; vol. 38; pp. 1891–1900.

\* cited by examiner

*Primary Examiner*—Fred Teskin
(74) *Attorney, Agent, or Firm*—Edgar E. Spielman, Jr.

(57) ABSTRACT

A batch process for the anionic polymerization of a styrenic monomer is described. The process brings together a liquid saturated hydrocarbon diluent, an ether promoter, an organolithium initiator and a styrenic monomer in such a way so as to maintain the reaction mixture at or below about 55° C. and so that the amount of organolithium initiator employed is in the range of about 1 to about 10 mol %, based upon the total amount of styrenic monomer to be added. Favorable polydispersity and molecular weight polymer characteristics are obtained.

27 Claims, No Drawings

ANIONIC POLYMERIZATION PROCESS

TECHNICAL FIELD

This invention relates to processes for the production of anionic polymers of styrenic monomers.

BACKGROUND

Polystyrene has many uses in the production of plastic articles and materials. For instance, brominated polystyrene is known to be a useful flame retardant for use in thermoplastics, e.g., polybutylene terephthalate, polyethylene terephthalate and nylon. The characteristics of the brominated polystyrene typically are determined by the process by which it is made. Polystyrene produced by anionic polymerization has been less preferred in the past because of its high cost and scarce availability. At least to some extent, these problems with respect to anionic polystyrene are a function of the complexity of the previously known processes for producing such a polymer. The processes previously employed, particularly those involving a batch operation, in the anionic polymerization of styrenic monomers have suffered from difficulties caused by the large exotherm created upon the initiation of the reaction being conducted, and from the generation of a product with high molecular weights and, in the case of cationic or free radical styrenic polymers, unfavorable polydispersity.

Thus, a need exists for a facile process for the production of anionic polymers of styrenic monomers which results in a product having suitable molecular weight and polydispersity characteristics. In the case of anionic styrenic polymers for use in the preparation of brominated styrenic flame retardants, it would be highly advantageous if a way could be found to produce an anionic styrenic polymer which is essentially free or free of olefinic and indane end groups which are common to cationic or free radical styrenic polymers. The avoidance of such end groups has been found to markedly increase the thermal stability of the resultant brominated styrenic polymer.

SUMMARY OF THE INVENTION

This invention is deemed to satisfy the foregoing needs in unique and elegant way by providing, amongst other things, a batch process for producing anionic styrenic polymer. The process avoids the use of aromatic solvents, such as benzene or toluene, and thus results in a polymer product substantially free of trace levels of such compounds, thereby avoiding the undesirable byproducts such impurities can create in downstream production of, e.g., brominated styrenic flame retardants. The process allows for higher reaction temperatures, as compared to previously known batch processes, while still controlling the process exotherm. Relative to previously known batch processes, lower amounts of ether promoter can be used in processes of this invention. This is especially advantageous when the desired product is a low molecular weight polymer because of the resulting economic benefits and the avoidance of deleterious effects of excessive promoter impurities in downstream products made from the polymer. The process comprises:

A) charging a liquid saturated hydrocarbon diluent and an ether promoter into a reactor; and then B) either 1) (i) charging a saturated hydrocarbon solution of organolithium initiator into the reactor, in an amount to provide in the range of about 1 to about 10 mol % of organolithium initiator based on the total amount of a styrenic monomer to be added followed by (ii) the controlled addition of the styrenic monomer such that the temperature of the resultant reaction mixture is maintained at or below about 55° C.; or 2) concurrently feeding separate feeds of (i) a styrenic monomer and (ii) a saturated hydrocarbon solution of organolithium initiator into the reactor, the feeds being maintained at rates to provide for the addition of an amount of organolithium initiator in the range of about 1 to about 10 mol % based on the total amount of styrenic monomer to be added, the temperature of the resultant reaction mixture being maintained at or below about 55° C. and feed (ii) being of a shorter duration than feed (i).

In a preferred embodiment of this invention, batch process for producing anionic styrenic polymer is provided. The process comprises charging cyclohexane and an ether promoter into a reactor, and then prefeeding about 1 percent of the total amount of styrene monomer to the reactor, and then concurrently feeding separate feeds of (i) the remaining styrene monomer and (ii) a saturated hydrocarbon solution of organolithium initiator into the reactor. When operating on a scale of about 3,000 to about 6,000 lbs. of styrenic monomer, it is desirable to maintain the concurrent feeds over a period of time in the range of about 2 to about 10 minutes and at rates to provide for the addition of an amount of organolithium initiator in the range of about 2.5 to about 3.5 mol % based on the total amount of the styrene monomer. The temperature of the resultant reaction mixture is maintained at or below about 55° C., and the styrene monomer is fed for a period of time not to exceed about 2 hours measured from initiation of the feeds (i) and (ii). The process is thus carried out so as to form an anionic styrenic polymer having a polydispersity index of about 1.2 or less.

These and still other embodiments, features and advantages of the present invention will become apparent from the following detailed description, examples and appended claims.

DETAILED DESCRIPTION OF THE INVENTION

The styrenic monomer of this invention may be any anionically polymerizable styrenic monomer. Suitable non-limiting examples include styrene, o-methylstyrene, m-methylstyrene, p-methylstyrene, (α-methylstyrene, ethylstyrene, tert-butylstyrene, dimethylstyrene, and the like including mixtures of two or more of the foregoing. Preferably, the styrenic monomer consists essentially of styrene.

The liquid saturated hydrocarbon diluent of this invention may be any aliphatic or cycloaliphatic hydrocarbon, or a mixture of two or more of the same, which is liquid under reaction conditions. The saturated hydrocarbon preferably contains in the range of about 4 to about 12 carbon atoms in the molecule. The aliphatic hydrocarbon may be linear or branched. Non-limiting examples of suitable aliphatic hydrocarbons include pentane, isopentane, hexane, 2-methylpentane, octane, 2,2,4-trimethylpentane and the like. More preferably, the liquid saturated hydrocarbon is one or more liquid saturated cycloaliphatic hydrocarbons. Suitable non-limiting examples of such cycloaliphatic hydrocarbons are cyclopentane, methylcyclopentane, cyclohexane, methylcyclohexane, cycloheptane, 1,3-dimethylcyclohexane, 1,4-dimethylcyclohexane and the like, with cyclohexane being particularly preferred as the liquid saturated hydrocarbon diluent.

The ether promoter of this invention may be a saturated aliphatic or cycloaliphatic monoether, a saturated aliphatic or cycloaliphatic diether or an aromatic ether. Thus, non-limiting examples of suitable ether promoters include tetrahydrofuran, methyl tert-butyl ether, ethyl tert-butyl ether, 1,4 dioxane, dimethoxyethane, methoxybenzene, and the like. The ether promoter is preferably a saturated cyclic or acyclic monoether having in the range of 4 to about 8 carbon atoms in the molecule. More preferably, the monoether is tetrahydrofuran (sometimes also referred to herein as "THF"), methyltetrahydrofuran or dimethyltetrahydrofuran, or a mixture of any two or more of these. Tetrahydrofuran is particularly preferred. In another particularly preferred embodiment of this invention, the monoether consists essentially of an alkyl tert-butyl ether. Suitable alkyl tert-butyl ethers include, e.g., linear and branched chain alkyl tert-butyl ethers such as, e.g., methyl tert-butyl ether (sometimes also referred to herein as "MTBE") and ethyl tert-butyl ether, with methyl tert-butyl ether being particularly preferred. It is desirable to use an ether that is a liquid under the reaction conditions being used.

The organolithium initiator may be one of many lithium-containing hydrocarbons. Suitable non-limiting examples include methyllithium, ethyllithium, n- or sec-butyllithium, isopropyllithium, cyclohexyllithium orphenyllithium, including mixtures of the foregoing. n-Butyllithium and sec-butyllithium are preferred, with n-butyllithium being particularly preferred. The organolithium initiator is used in solution with a saturated hydrocarbon which may be the same or different from the liquid saturated hydrocarbon diluent, but is preferably the same.

The number average molecular weight of the polymer product made in accordance with this invention can vary, but will preferably be in the range of Mn 1000 to about Mn 10,000. The polymer product produced in accordance with this invention typically will have a polydispersity which is about 1.5 or less, and preferably is about 1.2 or less.

Prefeeding a portion of the styrenic monomer is not required for all embodiments of this invention, but is preferred because it appears to reduce the likelihood of reaction between the ether promoter and the organolithium initiator. The portion of the styrenic monomer which is prefer can vary, but typically will be about 1 percent by weight of the total amount of the styrenic monomer to be used in carrying out the reaction.

The feeds are maintained to provide preferably in the range of about 1 to about 10 mol %, more preferably about 2 to about 5 mol %, and most preferably in the range of about 2.5 to about 3.5 mol % of organolithium initiator based on the total amount of the styrenic monomer.

When bringing the reactants together in processes of this invention, one should use the minimum feed times while at the same time maintaining the temperature of the reaction mixture no higher than about 55° C. For example, at a scale of about 4,000 lbs. of styrene feed, the feed rate of the organolithium feed is preferably about 2 to about 10 minutes, more preferably about 5 minutes, and the styrene co-feed should be effected in no more than about 2 hours, and more preferably within about 90 minutes or less, measured from initiation of co-feeding. However, when the monoether is methyl tert-butyl ether, at the foregoing scale, the styrene monomer co-feed preferably continues for a period of time not exceeding about 5 hours measured from initiation of the concurrent feeds. It will be noted that throughout this specification, including the appended claims, time periods provided are not scale dependent over the ranges of concentrations taught herein.

The reactor used in the process of this invention is typically equipped with a overhead heat exchanger. The process may be conducted at sub-atmospheric, atmospheric or super-atmospheric pressure. However, it is preferred to carry out the reaction at a reduced pressure, e.g., in the range from about 0.1 to about 0.7 atmospheres, so that the solvent is refluxed thereby providing consequent evaporative cooling of the highly exothermic reaction. The process of this invention is preferably conducted in the absence oxygen. Thus, the process should be carried out under an inert atmosphere such as, e.g., nitrogen or argon. The reaction system should be essentially anhydrous. By this is meant that small amounts of water insufficient to destroy the organolithium catalyst can be tolerated, but from a practical standpoint, the reaction equipment and reaction mixture should be kept as dry as reasonably practicable.

The temperature of the resultant reaction mixture is maintained at or below the specified temperature of about 55° C. by any known method. For example, the reactor in which the reaction is conducted can be equipped with an external, indirect heat exchanger with a pump-around loop. The heat exchanger itself can be provided with a suitable coolant, e.g., a glycol coolant. Preferably, the reaction mixture is maintained at a temperature in the range of about 25° C. to about 50° C. After the feeds are terminated, the reaction mixture typically is held at the reaction temperature for about 5–10 minutes, e.g., when employing a scale of 3000–6000 lbs. of styrenic monomer, and then contacting the reaction mixture with an amount of water which is in the range of about 1.25 to about 10 moles of water, and preferably about 1.25 to about 5 moles of water per mole of organolithium originally charged, to quench the reaction and terminate the catalytic activity. By use of the process of this invention and termination using water, substantially all of the resultant polymer is characterized by having one of its end groups terminated by a proton (i.e., a hydrogen atom). Resulting lithium hydroxide salt hydrate is separated from the polymer solution by washing the reaction mixture with water, preferably in a 7:1 organic: aqueous weight ratio (accounting for water previously added). The aqueous phase which results is separated and the polymer-containing organic phase is devolatilized of the ether promoter and saturated hydrocarbon. Devolatization can be carried out in a variety of ways, including for example by pre-heating the mixture in a heat exchanger and feeding it into a hot (200° C.) column under conditions such that the residual solvent and promoter are less than 0.5% by weight of the isolated polymer existing at the bottom of the column. The remaining polymer may then be dissolved in a suitable solvent, e.g., bromochloromethane, for storage.

Another way of terminating the reaction is to employ a lower alkyl halide, typically an alkyl chloride or an alkyl bromide, having in the range of 1 to about 8 carbon atoms. Use of an alkyl halide results in the formation of a styrenic polymer substantially all of which has one of its end groups terminated by an alkyl group rather than a proton. When using an alkyl halide to terminate the reaction, a stoichiometric amount, relative to the organolithium, should be employed. A feature of this embodiment is that the reaction product can remain substantially anhydrous since no water is added during production.

The amount of saturated hydrocarbon diluent and ether promoter employed in this invention may vary, but preferably is sufficient in the aggregate to cause the resultant reaction mixture to contain about 5 to about 70 wt %, and more preferably about 40 to about 60 wt %, of styrenic polymer upon termination of the styrene feed.

In another particularly preferred embodiment of this invention, styrenic polymer produced in accordance with the anionic polymerization process described above is placed in admixture with a brominating agent, such admixture being substantially free of a bromination catalyst, and fed to a catalytic quantity of a brominating agent. For further detailed teaching of such styrenic polymer bromination process, reference is made, for example, to U.S. Pat. No. 5,677,390, which is incorporated herein by reference.

In another particularly preferred embodiment of this invention, polystyrene produced in accordance with the anionic polymerization process described above is placed in solution and in admixture with a brominating agent, such admixture being substantially free of a bromination catalyst, and fed to a reactor containing a bromination catalyst and associated liquid, wherein the solvent used in forming the polystyrene solution and the liquid associated with the catalyst contains less than 200 ppm water between the two of them and the brominating agent contains less than about 100 ppm water. For detailed teaching of such polystyrene bromination process, reference is made, for example, to U.S. Pat. No. 5,852,132, which is incorporated herein by reference.

In another particularly preferred embodiment of this invention, styrenic polymer produced in accordance with the anionic polymerization process described above is contacted with a brominating agent in the presence of Lewis acid catalyst and solvent quantities of bromochloromethane. For further detailed teaching of such styrenic polymer bromination process, reference is made, for example, to U.S. Pat. No. 5,767,203, which is incorporated herein by reference.

In another particularly preferred embodiment of this invention, polystyrene produced in accordance with the anionic polymerization process described above, bromochloromethane solvent and a Lewis acid catalyst are placed in a reaction vessel, and then a brominating agent is added to the vessel. Alternatively, the polystyrene is not placed in the reaction vessel initially; it is instead feed in admixture with the brominating agent to the reaction vessel which was previously charged with bromochloromethane solvent and a Lewis acid catalyst. For further detailed teaching of such polystyrene bromination process, reference is made, for example, to U.S. Pat. No. 5,916,978, which is incorporated herein by reference.

In another particularly preferred embodiment of this invention, polystyrene produced in accordance with the anionic polymerization process described above, bromochloromethane solvent and a Lewis acid catalyst are placed in a reaction vessel, and then a brominating agent is added to the vessel. Alternatively, the polystyrene is not placed in the reaction vessel initially; it is instead feed in admixture with the brominating agent to the reaction vessel which was previously charged with bromochloromethane solvent and a Lewis acid catalyst. For further detailed teaching of such polystyrene bromination process, reference is made, for example, to U.S. Pat. No. 5,916,978, which is incorporated herein by reference.

In another particularly preferred embodiment of this invention, a first stream comprising brominating agent, a second stream comprising anionic styrenic polymer formed as taught herein, and a third stream comprising bromination catalyst, are fed to a mixer to intimately mix such streams. For further detailed teaching of such styrenic polymer bromination process, reference is made, for example, to U.S. Pat. No. 5,686,538, which is incorporated herein by reference.

In another particularly preferred embodiment of this invention, a bromination catalyst and associated liquid are provided in a reactor and a portion of the bromination catalyst and associated liquid is fed to a mixer external of the reactor; a brominating agent and a solution of anionic polystyrene formed in accordance with the process taught herein are fed as separate streams to the external mixer, in which the separate streams, prior to being fed to the external mixer, are substantially free of a bromination catalyst, the solvent used in forming the polystyrene solution and the liquid associated with the catalyst contains less than 200 ppm water between the two of them, and the brominating agent contains less than about 100 ppm water. For further detailed teaching of such polystyrene bromination process, reference is made, for example, to U.S. Pat. No. 5,852,131, which is incorporated herein by reference.

In another particularly preferred embodiment of this invention, anionic polystyrene produced as described herein is mixed with a brominating agent and fed to a reaction vessel to which was previously added bromochloromethane solvent and a Lewis acid catalyst, the mole ratio of brominating agent to polystyrene in the feed mixture being from about 1:1 to about 8:1. For further detailed teaching of such polystyrene bromination process, reference is made, for example, to U.S. Pat. No. 6,207,765 B1, which is incorporated herein by reference.

The following non-limiting Examples illustrate the invention. Expressions given in parts per million (ppm) in this description are on a weight basis.

The apparatus used in conducting the operations of the Examples was as follows:

A) Pressure filtration apparatus. Two types were used. In Apparatus 1, a Pall Gelman in-line filter holder (VWR #28144-506) or a Pall Gelman filtration funnel (VWR #28144-652) was attached to the bottom of a 1-L bomb using ½-inch stainless tubing and ½-inch ball valves. The end caps on the filtration funnel were drilled and tapped to accept ½-inch pipe thread fittings. A vacuum line and nitrogen line were attached to the top of the bomb. Filtration of a sample was accomplished by vacuum suction of about 800 mL of solution into the bomb. The vacuum line was closed, and the system was pressured to 10 to 37 psi with nitrogen. Once the system was pressured, the valve to the receiver was slowly opened. Filter paper (Whatman 1004047, Millipore AP20_042_00), membranes (Millipore LCWP_047_00) or screen (Spectrum 146_476, 148_986, 146_510) cut to about 47 mm in diameter were used as the filter media. A 4-inch Filterite cartridge holder (model 910622-040) was also employed in the filtration experiments. Filter elements used were PFT 30-4UE-M3, PFT 10-4UE-M3, and PFT 3-4UE-M3. This holder and elements were chosen for convenience and were found to be attacked by the cyclohexane solvent. Swelling of the O-ring seal in the holder was particularly bad.

In Apparatus 2, a 1-gallon milk can was fitted with a nitrogen line and a ¼-inch take off line feeding a Pall Gelman filtration funnel (see apparatus 1). The same filter media as in apparatus 1 were employed.

B) Styrene Addition. Masterflex LIS peristaltic pumps (7523-40, 10 to 600 rpm; 7523-50, 1.6 to 100 rpm) fitted with model 7021-24 pumpheads were used to manually meter the styrene into the reaction mixture. The styrene feed line was composed of two sections of ⅛-inch Teflon® polymer tubing joined by a one foot section of #14 Viton® polymer tubing. The styrene feed pot was a suitably sized Erlenmeyer flask with a 24/40 ground joint. A dual ace #7 thread adapter was fitted to the flask. The flask had a nitrogen inlet and one end of the styrene feed line served as the dip tube. The flask was placed on a balance for monitoring the rate of weight loss. The other end of the styrene feed line was connected to a ⅛-inch stainless steel straight tubing fitting. This fitting was attached to a one foot section of Teflon polymer tubing which was passed through one side of a dual ace #7 thread adapter. The end of the styrene was held in place by attachment to a ¼ Teflon® polymer coated K-type thermocouple using a one inch section of ⅜-inch Teflon® polymer tubing.

C) n-Butyl Lithium Addition. In the majority of the work conducted, the n-butyllithium (sometimes also referred to herein as "BuLi") was transferred to a suitably sized pressure equalizing addition funnel in a nitrogen purge box. The funnel was fitted with a Teflon® polymer needle valve type stopcock. A 9-inch section of Teflon® polymer tubing was snugly fitted over the end of the drip tip to allow for the subsurface addition of the n-butyllithium solution.

In some of the runs, the n-butyllithium solution was manually metered subsurface into the reaction mixture using a Masterflex L/S pump fitted with a model 77390-00 Teflon® polymer tubing pump head. The feed line was composed of a 6 mm OD (77390-60) tubing section specifically designed for the pumphead connected to two lengths of ¼-inch Teflon® polymer tubing using straight Swagelok tubing adapters.

The general reaction conditions used for the synthesis of anionic polystyrene were as follows: A suitably-sized filly jacketed, 5 neck, bottom drain, round bottom flask along with other glassware was dried and placed under a nitrogen atmosphere while still hot. Cyclohexane and the desired promoter were charged to the reactor and adjusted to the desired temperature. In some instances, the solvents and styrene were dried over activated alumina before use and handled under nitrogen. The dried solvents were transferred to the reactor under nitrogen pressure through ¼-inch Teflon polymer tubing. Two circulating baths were used for temperature control; one at various temperatures for the reactor and one at 2 to 5° C. for the condenser. A portion of the styrene was prefer to the mixture then the n-butyllithium addition was started. The n-butyllithium was added over a period of 0.5 to 10 minutes. The styrene was fed over 0.5 to 5 hours then the reaction was stirred for 10 minutes before it was quenched with an electrophile (usually water). The LiOH by-product was usually removed by water washing the product solution. The aqueous phase cut was conducted at 50 to 65° C. The solvent was removed from the polymer by stripping the mixture to a solvent content of about 15% in a round bottom flask then heating to 210° C. in an oven under a slight nitrogen purge. The devolatized resin was allowed to cool to ambient temperature then ground for analysis and storage. See the appropriate table entry for details not provided in the experimental description.

Polymerizations in Cyclohexane at the I-L Scale

EXAMPLE 1

Comparative

Styrene (214 g, fed above solvent surface) was polymerized in cyclohexane (409 g) using 14.7 g of a 16.9 wt % solution of n-butyllithium in cyclohexane. The reaction was killed with 150 g of water and held at 53° C. overnight. The solution was washed two more times with 150 g of water and submitted for GPC analysis.

EXAMPLE 2

Styrene (199 g, fed above solvent surface) was polymerized in cyclohexane (417 g) containing tetrahydrofuran (27.5 g) using 14.5 g of a 16.9 wt % solution of n-butyllithium in cyclohexane. The reaction was killed with 150 g of methanol. The resulting mixture was added to 2L of methanol at 60° C. A taffy-like solid was removed from the flask and placed in an oven for final devolatization.

EXAMPLE 3

Styrene (201 g, fed above solvent surface) was polymerized in cyclohexane (185 g) containing tetrahydrofuran (30 g) using 14.6 g of a 16.9 wt % solution of n-butyllithium in cyclohexane. At the start of the n-butyllithium addition, an uncontrollable exotherm resulted in some material being lost through the n-butyllithium addition point. The reaction was killed with 1259 of water. The organic phase was placed in an oven for devolatization.

EXAMPLE 4

Styrene (200 g, fed above solvent surface) was polymerized in cyclohexane (185 g) containing tetrahydrofuran (6 g) using 15.7 g of a 16.9 wt % solution of n-butyllithium in cyclohexane. The reaction was killed with 40 g of water. The organic phase was placed in an oven for devolatization.

EXAMPLE 5

Styrene (200 g, fed above solvent surface) was polymerized in cyclohexane (114 g) containing tetrahydrofuran (3 g) using 15.7 g of a 16.9 wt % solution of n-butyllithium in cyclohexane. The reaction was killed with 10 g of water. The organic phase was placed in an oven for devolatization.

The observed results of Examples 1–5 are summarized below in Table 1. In this and all other tables set forth below, time is expressed in minutes and temperature is expressed in degrees Celcius, unless otherwise noted. Also, in this and all subsequent tables, APS=anionic polystyrene, Bu=butyl, BuLi=n-butyllithium, PD=polydispersity, PS=polystyrene, THF=tetrahydrofuran, MTBE=methyl tert-butyl ether, $M_n$=number average molecular weight, $M_w$=weight average molecular weight, Tg=glass transition temperature; Xpct=expected.

TABLE 1

| EXAMPLE | 1 | 2 | 3 | 4* | 5* |
|---|---|---|---|---|---|
| Solvent | | | cyclohexane | | |
| Wt % PS | 33 | 31.5 | 50 | 50 | 60 |
| mol % BuLi | 1.92 | 2.03 | 2.03 | 2.2 | 2.2 |

TABLE 1-continued

| EXAMPLE | 1 | 2 | 3 | 4* | 5* |
|---|---|---|---|---|---|
| promoter | — | THF | THF | THF | THF |
| mol ratio | — | 10 | 10 | 2 | 1 |
| Xpct Mn | 5420 | 5130 | 5130 | 4730 | 4730 |
| Obs Mn | 21000 | 6200 | 7200 | 4900 | 9600 |
| PD | 1.4 | 1 | 1.2 | 10 bimodal | 1 |
| Styrene prefeed | yes 25% | yes 25% | yes 25% | yes 25% | no |
| jacket temp (° C.) | 54 | 50 | 30 | 10 | 10–25 |
| int temp | 47 | 48 | 28 | 14 | 14 |
| peak temp | 64 | 74 | uncontrolled exotherm | 72 | 45 |
| time to peak (min) | 8 | 0.5 | 0.5 | 1.5 add BuLi slowly | 6–8 add THF at 5 min |
| time to styrene feed | 20 | 15 | 10 | 6 | 0 |
| rxn temp | 65 | 61 | 50 | 60 | 40–45 |
| addition time | 45 | 50 | 30 | 40 | 35 |
| final hold time | 30 | 30 | 30 | 30 | 30 |
| hold temp | 50–55 | 50–55 | 50–55 | 50–55 | 50–55 |
| kill method | $H_2O$ | MeOH | $H_2O$ | $H_2O$ | $H_2O$ |
| Isolation Method | MeOH precip | hot MeOH precip | — | — | distilled azeo |
| Isolation Obs | coarse powder | dough ball | — | — | mixt boils at 85 but foamy |
| water wash | OK | — | — | — | — |
| Tg (° C.) | 93 | 74 | — | — | — |
| 1% wt loss | 358 | 186 | — | — | — |
| 5% wt loss | 382 | 370 | — | — | — |
| 10% wt loss | 390 | 382 | — | — | — |

*no purification

Further Recipe Development at the I-L Scale in Cyclohexane with Tetrahydrofuran Promoter

EXAMPLE 6

Styrene (200 g, fed above solvent surface) was polymerized in cyclohexane (168 g) containing tetrahydrofuran (8 g) using 21.5 g of a 16.9 wt % solution of n-butyllithium in cyclohexane. The reaction was killed with 10 g of MeBr. The organic mixture was placed in an oven for devolatization.

EXAMPLE 7

Styrene (200 g, fed above solvent surface) was polymerized in cyclohexane (131 g) containing tetrahydrofuran (9 g) using 21.5 g of a 16.9 wt % solution of n-butyllithium in cyclohexane. The reaction was killed with 4 g of water and the reaction color slowly dissipated. The organic mixture was placed in an oven for devolatization.

EXAMPLE 8

Styrene (200 g, fed above solvent surface) was polymerized in cyclohexane (106 g) containing tetrahydrofuran (8 g) using 22.1 g of a 16.9 wt % solution of n-butyllithium in cyclohexane. The reaction was killed by slowly adding 7.5 g of 48% HBr. The organic mixture was placed in an oven for devolatization.

EXAMPLE 9

Styrene (200 g, fed above solvent surface) was polymerized in cyclohexane (107 g) containing tetrahydrofuran (8 g) using 22.1 g of a 16.9 wt % solution of n-butyllithium in cyclohexane. The reaction was killed by slowly adding 7.5 g of 48% HBr dissolved in 50 g of water. The organic mixture was placed in an oven for devolatization.

EXAMPLE 10

Styrene (200 g, fed above solvent surface) was polymerized in cyclohexane (103 g) containing tetrahydrofuran (12.5 g) using 22.5 g of a 16.9 wt % solution of n-butyllithium in cyclohexane. The reaction was killed by slowly adding 9 g of 48% HBr dissolved in 50 g of water. The organic mixture was placed in an oven for devolatization. The characteristics of the different portions of the mixture are summarized below in Table 2.

TABLE 2

|  | aqueous from phase cut | distilled organic | distilled aqueous |
|---|---|---|---|
| THF | 0.85% | 13.5% | 5.17% |
| Cyclohexane | ~10 ppm | 86.5% | ~10 ppm |
| Water | 99.15% | 520 ppm | 94.8% |

EXAMPLE 11

Styrene (200 g, fed above solvent surface) was polymerized in cyclohexane (96 g) containing tetrahydrofuran (13.5 g) using 22.7 g of a 16.9 wt % solution of n-butyllithium in cyclohexane. The reaction was killed by slowly adding 50 g of water. The organic mixture was placed in an oven for devolatization.

The results from Examples 6–11 are summarized below in Table 3.

TABLE 3

| EXAMPLE | 6 | 7 | 8 | 9 | 10 | 11 |
|---|---|---|---|---|---|---|
| Wt % PS | 50 | 55 | 60 | 60 | 59 | 60 |
| mol % BuLi | 3 | 3 | 3.09 | 3.09 | 3.14 | 3.09 |
| THF/BuLi | 2 | 2.2 | 2 | 2 | 3 | 3.15 |
| Xpct Mn | 3470 | 3470 | 3370 | 3370 | 3320 | 3370 |
| Obs Mn[a,b] | 4100 (2700) | 3900 (3600) | 3600 (3600) | 3460 | 3310 | 3470 |
| Obs Mw | 5400 (5000) | 4400 (3900) | 4700 (4000) | 4090 | 3720 | 3860 |
| PD | 1.3 (1.9) | 1.1 (1.1) | 1.3 (1.1) | 1.18 | 1.12 | 1.11 |
| % Bu end groups | 2.05 | 1.7 | 1.72 | 1.72 | 1.96 | 1.82 |
| Tg (° C.) | 79 | 83 | 81 | 82 | 73 | — |
| Dried reagents | no | no | yes | yes | yes | yes |
| Styrene prefeed | yes 10% | yes 10% | yes 5% | yes 5% | yes 5% | yes 5% |
| int jacket temp (° C.) | 25 | 25 | 25 | 25 | 25 | 25 |
| int temp | 27 | 25 | 25 | 25 | 25 | 25 |
| BuLi addition time (min) | 3 | 3 | 2 | 2 | 3 | 2 |
| peak temp | 45 | 45 | 45 | 43 | 42 | 45 |
| time to peak (min) | 2 | 2 | 1.5 | 1.5 | 1 | 1 |
| rxn temp | 40–50 | 40–50 | 40–50 | 40–50 | 40–50 | 40–50 |
| addition time | 35 | 45 | 45 | 40 | 40 | 40 |
| final hold time | 25 | 20 | 10 | 15 | 10 | 10 |
| hold temp | 55 | 55 | 55 | 55 | 55 | 55 |
| kill method | MeBr 10 g | $H_2O$ 4 g | 48% HBr 7.5 g | 48% HBr 7.5 g in 50 g $H_2O$ | 48% HBr 7.5 g in 50 g $H_2O$ | 50 g $H_2O$ |
| water wash | no | no | no | yes | yes | yes |
| Isolation Method | strip solv heat to 210 | strip solv heat to 210 @ 67 mm for 1 h | strip solv heat to 210 @ 0.5 to 5 mm for 2 h | strip solv heat to 210 @ 1 to 5 mm for 1 h | strip solv heat to 200 for 2 h | strip solv heat to 210 for 2 h |
| Isolation Obs | cloudy pale yellow solution and prod | mixture was slow to decolorize 10° C. heat kick | 4 min to decolorize 15° C. heat kick | 10° C. heat kick clean phase sep at 55° C. | rec 55 g aq material | rec 45 g of aq material |
| ppm cyclohexane | 6600 | 770 | <10 | 230 | 8800 | 5140 |
| ppm Li | 7360 | 2090 | 809 | 134 | 99 | — |

[a]) values in parentheses are duplicate measurements
[b]) values in bold were collected with an improved GPC method Recipe Development at the 4-L Scale in Cyclohexane with Tetrahydrofuran Promoter

EXAMPLE 12

In a resin kettle flask, styrene (1800 g, fed above solvent surface) was polymerized in cyclohexane (836 g) containing tetrahydrofuran (149 g) using 215.5 g of a 16.9 wt % solution of n-butyllithium in cyclohexane. The reaction was killed by slowly adding 300 g of water and it took over 30 minutes for the mixture to decolorize. Portions of the organic mixture were used to study solvent devolatization.

EXAMPLE 13

In a resin kettle flask, styrene (1810 g, fed above solvent surface) was polymerized in cyclohexane (837 g) containing tetrahydrofuran (123 g) using 219.5 g of a 16.9 wt % solution of n-butyllithium in cyclohexane. The reaction was killed by slowly adding 50 g of MeOH followed by 400 g of water. It took over 30 minutes for the mixture to decolorize.

EXAMPLE 14

Styrene (1520 g, fed below solvent surface) was polymerized in cyclohexane (1150 g) containing tetrahydrofuran (173 g) using 183 g of a 16.9 wt % solution of n-butyllithium in cyclohexane. The reaction was killed by adding 18 g of water, which gave a filterable solid. The mixture was washed 3×1 L with water. The organic mixture was placed in an oven for devolatization.

EXAMPLE 15

Styrene (1780 g, fed below solvent surface) was polymerized in cyclohexane (1340 g) containing tetrahydrofuran (208 g) using 221 g of a 16.9 wt % solution of n-butyllithium in cyclohexane. The reaction was killed by adding 14 g of water. The mixture was washed 3×500 mL with water. Some solvent (about 1200 mL) was stripped and the resulting organic mixture was placed in an oven for devolatization.

EXAMPLE 16

Styrene (1800 g, fed below solvent surface) was polymerized in cyclohexane (1320 g) containing tetrahydrofuran (213 g) using 224.5 g of a 16.9 wt % solution of n-butyllithium in cyclohexane. The reaction was killed by adding 22.3 g of water. The mixture was washed 3×500 mL with water. Some solvent (about 1200 mL) was stripped and the resulting organic mixture was placed in an oven for devolatization.

EXAMPLE 17

Styrene (1808 g, fed below solvent surface) was polymerized in cyclohexane (1340 g) containing tetrahydrofuran (210 g) using 224 g of a 16.9 wt % solution of n-butyllithium in cyclohexane. The reaction was killed by adding 450 g of water. The mixture was then washed 2×500 mL with water. Some solvent (about 1200 mL) was stripped and the resulting organic mixture was placed in an oven for devolatization.

The results from Examples 12–17 are summarized below in Table 4.

TABLE 4

| EXAMPLE | 12 | 13 | 14 | 15 | 16 | 17 |
|---|---|---|---|---|---|---|
| Wt % PS | 60 | 60 | 50 | 50 | 50 | 50 |
| mol % BuLi | 3.25 | 3.3 | 3.3 | 3.37 | 3.38 | 3.38 |
| THF/BuLi | 3.5 | 3 | 5 | 5 | 5 | 5 |
| Xpct Mn | 3205 | 3470 | 3160 | 3090 | 3080 | 3080 |
| Obs Mn[a,b] | 3300 | 3230 | 3200 | 3040 | 3050 | 3110 |
| Obs Mw | 4600 | 4040 | 3800 | 3600 | 3560 | 3700 |
| PD | 1.4 | 1.4 | 1.2 | 1.19 | 1.17 | 1.19 |
| % Bu end groups | 2.15 | 2.05 | 2.2 | 2.14 | 2.16 | 2.09 |
| Theory - % Bu end groups | 1.75 | 1.78 | 1.76 | 1.82 | 1.82 | 1.82 |
| Tg (° C.) | — | — | — | 76 | 75 | 77 |
| Styrene prefeed | yes 5% | yes 5% | yes 10% | yes 17% | yes 10–17% | yes 10–17% |
| Styrene feed | above | above | below | below | below | below |
| int jacket temp (° C.) | 20 | 25 | 25 | 10 | 7 | 7 |
| int temp | 21 | 23 | 26 | 10 | 8 | 8 |
| BuLi addition time (min) | 4 | 5 | 2 | 1 | 1 | 1 |
| peak temp | 55 | 52 | 56 | 60 | 52 | 53 |
| time to peak (min) | ? | 2 | 2 | 1 | 1 | 1 |
| rxn temp | 60 | 60 | 45–55 | 40–50 | 40–50 | 40–50 |
| addition time | 120 | 120 | 120 | 120 | 110 | 110 |
| final hold time | 10 | 10 | 10 | 10 | 10 | 10 |
| hold temp | 55 | 55 | 55 | 55 | 55 | 55 |
| kill method | $H_2O$ 300 g | $M_eOH$ 50 g | $H_2O$ 18 g | $H_2O$ 14 g | $H_2O$ | $H_2O$ |
| water wash | yes | yes | yes | yes | yes | yes |
| Isolation Method | strip solv heat to 210 | strip solv heat to 210 | strip solv heat to 210 | strip solv heat to 210 @ 20 mm Hg for 3 h | strip solv heat to 190 for 2 h then 210 @ 20 mm Hg for 3 h | strip solv heat to 210 |
| Isolation Obs | mixture took 30 min to decolorize | had to add 400 g $H_2O$ to kill | filtrate solid then water wash 3 × 500 mL | very slow settling solid then water wash | — | — |
| ppm cyclohexane | 7200 | 4000 | 9100 | 2400 | 4500 | 1400 |
| ppm Li | — | — | — | 147 | 67 | 245 |

Process Development at the 4-L Scale in Cyclohexane using Tetrahydrofuran Promoter

EXAMPLE 18

Styrene (1800 g, fed below solvent surface) was polymerized in cyclohexane (1424 g) containing tetrahydrofuran (126 g) using 223 g of a 16.9 wt % solution of n-butyllithium in cyclohexane. The reaction was killed by adding 21 g of water. A 450 g portion of the mixture was then washed with water devolatized and submitted for analysis. The remaining solution was stripped of about 1200 mL of solvent and stored in 1 quart bottles.

EXAMPLE 19

Styrene (1889 g, fed below solvent surface) was polymerized in cyclohexane (1470 g) containing tetrahydrofuran (134 g) using 222 g of a 16.9 wt % solution of n-butyllithium in cyclohexane. The reaction was killed by adding 71 of hexyl chloride dissolved in 73 9 of cyclohexane. A 405 g portion of the mixture was then washed with water, devolatized, and submitted for analysis. The remaining solution was cloudy due to the LiCl salt. The salt was not filterable even with a 0.45 micron filter. The remaining solution was discarded.

EXAMPLE 20

Styrene (1805 g, fed below solvent surface) was polymerized in cyclohexane (1486 g) containing tetrahydrofuran (124 g) using 224 g of a 16.9 wt % solution of n-butyllithium in cyclohexane. The reaction was conducted at a pressure of 247 mm Hg which caused the solvent to mildly reflux at 48 to 52° C. The reaction was killed by adding 20.7 g of water. Several attempts were made to filter off the solid using apparatus 1 with the Pall Gelman filter holders. None of the filtration conditions were satisfactory.

EXAMPLE 21

Styrene (1803 g, fed below solvent surface) was polymerized in cyclohexane (1495 g) containing tetrahydrofuran (127 g) using 225 g of a 16.9 wt % solution of n-butyllithium in cyclohexane. The reaction was conducted at a pressure of 242 mm Hg which caused the solvent to mildly reflux at 470° C. The reaction was killed by adding 21 g of water. The solution was filtered using apparatus 1 and the Filterite system using 30, 10, and 3-μm cartridges Acceptable filtrations were achieved with the 10 and 3-μm filter elements. The flow rate through the 3-μm element dropped more quickly than that through the 10 but it gave a greater clarity. Material that passed through the 3-μm filter was devolatized in a lab WFE at 210° C. under atmospheric pressure and a vacuum of about 30 mm Hg. A slight nitrogen purge was required to force the flashed solvent through the WFE overhead.

EXAMPLE 22

Styrene (1803 g, fed below solvent surface) was polymerized in cyclohexane (1482 g) containing tetrahydrofuran (130 g) using 224 g of a 16.9 wt % solution of n-butyllithium in cyclohexane. The styrene addition was conducted over a period of about 5 hours. The reaction was killed by adding 250 g of water. Some solvent (about 1200 mL) was stripped and the resulting organic mixture was placed in an oven for devolatization. The characteristics of the different portions of the mixture are summarized below in Table 5.

TABLE 5

|  | aqueous from phase cut | distilled organic | distilled aqueous | APS solution |
|---|---|---|---|---|
| THF | 0.55% | 7.4% | 3.3% | 1.1% |
| Cyclohexane | <10 ppm | 92.6% | <10 ppm | 21.7% |
| Water | 99.34% | <100 ppm | 96.5% | — |
| % APS | — | — | — | 77.1% |

EXAMPLE 23

Styrene (1803 g, fed below solvent surface) was polymerized in cyclohexane (1475 g) containing tetrahydrofuran (130 g) using 226 g of a 16.9 wt % solution of n-butyllithium in cyclohexane. The reaction was killed by adding 245 g of water. The mixture was then washed 2×300 mL with water. Some solvent (about 1200 mL) was stripped and the resulting organic mixture was placed in an oven for devolatization.

The results from Examples 18–23 are summarized below in Table 6.

with a freshly regenerated acidic ion exchange resin (Amberlyst 16, 120 g). The red color did not dissipate, so 20 g of water was added. The mixture was then washed 3×400 mL with water. The remaining resin was filtered out of the polymer solution before devolatization. Some solvent (about 1200 mL) was stripped and the resulting organic mixture was placed in an oven for devolatization.

EXAMPLE 25

Styrene (1796 g, fed below solvent surface) was polymerized in cyclohexane (1477 g) containing tetrahydrofuran (126 g) using 247 g of a 15 wt % solution of n-butyllithium in cyclohexane from Chemtal. The reaction was killed by adding 500 g of water. The mixture was then washed 2×400 mL with water. Some solvent (about 1200 mL) was stripped and the resulting organic mixture was placed in an oven for devolatization.

Polymerization in Cyclohexane with Methyl Tert-Butyl Ether Promoter

EXAMPLE 26

Styrene (1803 g, fed below solvent surface) was polymerized in cyclohexane (1485 g) containing methyl tert-

TABLE 6

| EXAMPLE | 18 | 19 | 20 (vac) | 21* (vac) | 22* (xtnd) | 23 |
|---|---|---|---|---|---|---|
| Wt % PS | 50 | 50 | 50 | 50 | 50 | 50 |
| mol % BuLi | 3.38 | 3.38 | 3.38 | 3.41 | 3.39 | 3.42 |
| THF/BuLi | 3 | 3 | 3 | 3 | 3 | 3 |
| Xpct Mn | 3080 | 3080 | 3080 | 3060 | 3070 | 3040 |
| Obs Mn | 3200 | 3400 | 3200 | 3200 | 3500 | 3100 |
| Obs Mw | 3300 | 3500 | 3400 | 3400 | 4100 | 3300 |
| PD | 1.02 | 1.04 | 1.04 | 1.04 | 1.17 | 1.05 |
| % Bu end groups | 2.1 | 4.1 | 2.33 | 2.24 | 2.28 | 2.06 |
| Theory - % Bu end groups | 1.82 | — | 1.82 | 1.84 | 1.83 | 1.85 |
| %-$CH_2$—O | — | — | 0.04 | 0.02 | 0.15 | 0.03 |
| Tg (° C.) | 77 | — | 64 | 73 | 73 | 77 |
| Styrene prefeed | yes 3.3% | yes 1.7% | yes 5% | yes 1% | yes 10% | yes 10% |
| Styrene feed | below | below | below | below | below | below |
| int jacket temp (° C.) | 25 | 25 | 30 | 30 | 30 | 7 |
| int temp | 25 | 25 | 30 | 30 | 30 | 7.4 |
| BuLi addition time (min) | 4 | 8 | 8 | 10 | 2 | 1 |
| peak temp | 45 | 43 | 45 | 45 | 60 | 45 |
| time to peak (mm) | 2 | 3 | 1.75 | 3 | 1 | 1 |
| rxn temp (° C.) | 50 | 45–50 | 45–50 | 45–50 | 45–50 | 45–50 |
| addition time | 90 | 100 | 90 | 60 | ~5 h | 120 |
| final hold time | 10 | 10 | 10 | 10 | 10 | |
| hold temp | 55 | 55 | 55 | 55 | 55 | 55 |
| kill method | $H_2O$ 21 g | $H_e$ × Cl 73 g | $H_2O$ 21 g | $H_2O$ 21 g | $H_2O$ | $H_2O$ |
| water wash | yes | yes | no | no | yes 250 g | yes 250 g |
| Isolation Method | strip solv heat to 90 | strip solv heat to 210 | strip solv heat to 210 | WFE and filtration expts | strip solv heat to 90 and then heat to 210 for 3 h | strip solv heat to 210 for 3 h then @ >10 mm Hg for 1 h |
| Isolation Obs | obtained 75 wt % solution | LiCl not filterable | filtration experiments | — | rec 225 g from aq cut | rec 166 g from aq cut |
| % cyclohexane | — | 1.0 | 1.940 | @ 760 0.660 @ 36 0.07 | 0.880 | 0.060 |
| % THF | — | — | 0.050 | @ 760 0.020 @ 36 >0.01 | 0.020 | ND |
| ppm Li | 2300 | — | 30 μm - 400 10 μm - 230 | 10 μm - 290 3 μm - 200 | 870 | 368 |

EXAMPLE 24

Styrene (1803 g, fed below solvent surface) was polymerized in cyclohexane (1498 g) containing tetrahydrofuran (128 g) using 224 g of a 16.9 wt % solution of n-butyllithium in cyclohexane. An attempt was made to kill the reaction butyl ether (152 g) using 223 g of a 16.9 wt % solution of n-butyllithium in cyclohexane. The reaction was killed by adding 400 g of water. The water was added over a short time period, and the resulting heat kick cause the mixture to foam all the way to the knock out pot. The mixture was then washed 2×400 mL with water. Some solvent (about 1200 mL) was stripped, and the resulting organic mixture was placed in an oven for devolatization.

EXAMPLE 27

Styrene (1800 g, fed below solvent surface) was polymerized in cyclohexane (1490 g) containing methyl tert-butyl ether (154 g) using 226 g of a 16.9 wt % solution of n-butyllithium in cyclohexane. The reaction was killed by adding 22 g of water over 10 minutes. More water (310 g) was added for the water wash. Some solvent (about 1200 mL) was stripped, and the resulting organic mixture was placed in an oven for devolatization.

EXAMPLE 28

Styrene(1818 g, fed below solvent surface)was polymerized in cyclohexane (1487 g) containing methyl tert-butyl ether(154 g) using 230 g of a 16.9 wt % solution of n-butyllithium in cyclohexane The styrene feed time was 4.8 hours. The reaction was killed by adding 22 g of water over 10 minutes. More water (490 g) was added for the water wash. Some solvent (about 1200 mL) was stripped, and the resulting organic mixture was placed in an oven for devolatization.

EXAMPLE 29

Styrene (1800 g, fed below solvent surface) was polymerized in cyclohexane (850 g) containing methyl tert-butyl ether (776 g) using 224 g of a 16.9 wt % solution of n-butyllithium in cyclohexane. The reaction was conducted at the boiling point of the mixture which was observed to be 66° C. The reaction was killed by adding 22 g of water over 10 minutes. More water (500 g) was added for the water wash. Some solvent (about 1200 mL) was carefully stripped off of the solution so as to prevent the foam from being forced into the overhead. The resulting organic mixture was placed in an oven for devolatization, and it foamed out of the pan.

The results from Examples 24–29 are summarized below in Table 7.

TABLE 7

| EXAMPLE | 24 | 25 (Chemtal) | 26 | 27 | 28 (xtnd) | 20 (reflux) |
|---|---|---|---|---|---|---|
| Wt % PS | 50 | 50 | 50 | 50 | 50 | 50 |
| mol % BuLi | 3.4 | 3.4 | 3.38 | 3.42 | 3.45 | 3.38 |
| Promoter/BuLi | 3 | 3 | 3 | 3 | 3 | 3 |
|  | THF | THF | MTBE | MTBE | MTBE | MBTE |
| Xpct Mn | 3060 | 3060 | 3080 | 3040 | 3020 | 3080 |
| Obs Mn | 3270 | 3190 | 3300 | 3290 | 3310 | 3000 |
| Obs Mw | 3360 | 3270 | 3650 | 3760 | 4040 | 3700 |
| PD | 1.03 | 1.02 | 1.11 | 1.14 | 1.22 | 1.2 |
| % Bu end groups | 2.21 | 2.04 | 1.88 | 1.93 | 1.80 | 2.05 |
| Theory - % Bu end groups | 1.83 | 1.83 | 1.82 | 1.84 | 1.86 | 1.82 |
| %-$CH_2$—O | 0.04 | 0.03 | ND | ND | ND | ND |
| Tg (° C.) | 74 | 78 | 78 | 80 | — | — |
| Styrene prefeed | yes | yes | yes | yes | yes | yes |
| Styrene feed | 10% below | 10% below | 10% below | 10% below | 10% below | 1% below |
| int jacket temp (° C.) | 7 | 7 | 7 | 7 | 7 | 35 |
| int temp | 8.5 | 7.4 | 7.7 | 7.4 | 7.5 | 34 |
| BuLi addition time (min) | 1.5 | 1 | 0.5 | 0.5 | 0.5 | 4.75 |
| peak temp | 45 | 43 | 43 | 43 | 40 | 43 |
| time to peak (min) | 1 | 1 | 1.5 | 1.5 | 1.5 | 2 |
| rxn temp | 50 | 45–50 | 45–50 | 45–50 | 45–50 | 66 |
| addition time | 120 | 100 | 80 | 160 | 290 | 120 |
| final hold time | 10 | 10 | 10 | 10 | 10 | 10 |
| hold temp | 55 | 55 | 55 | 55 | 55 | 55 |
| kill method | $H_2O$ 21 g | $H_2O$ 500 g | $H_2O$ 400 g | $H_2O$ 21 g | $H_2O$ 22 g | $H_2O$ 22 g |
| water wash | yes | yes | yes | yes | yes | yes |
| Isolation Method | strip solv heat to 210 for 3 h then @ <10 mm Hg for 1 h | strip solv heat to 210 for 4 h then @ <10 mm Hg for 2 h | strip solv heat to 210 for 3 h then @ <10 mm Hg for 1 h | strip solv heat to 210 for 2 h then @ <10 mm Hg for 3 h | strip solv heat to 210 for 2 h then @ <10 mm Hg for 2 h | strip solv heat to 210 for 2 h then @ >10 mm Hg for 2 h |
| Isolation Obs | attempted kill with acidic resin did not work | — | added water too fast and mixt foamed to knock out pot | added kill water over 10 min no foaming problem | added kill water over 10 min no foaming problem | poor phase separation and mixt foamed during devolatization |
| % cyclohexane | 0.58 | 0.11 | 0.08 | 0.02 | 0.03 | 0.58 |
| % THF | <0.01 | <0.01 | <0.01 | <0.01 | <0.01 | (MTBE) 0.06 |
| ppm Li | 436 | 176 | 119 | 157 | — | — |

Other Polymerizations in Cyclohexane with
Tetrahydrofuran Promoter

EXAMPLE 30

Bimodal Anionic Polystyrene and Solvent Swap

Styrene (1802 g, fed below solvent surface) was polymerized in cyclohexane (1487 g) containing tetrahydrofuran (129 g) using 224 g of a 16.9 wt % solution of n-butyllithium in cyclohexane. Using the typical reaction conditions, 139 g of n-butyllithium solution was reacted with 1400 g of styrene. The styrene feed was slowed and 86 g of n-butyllithium solution was added. The styrene feed was resumed at the normal rate, and the final 400 g of monomer was added. The reaction was killed by adding 21 g of water. More water (478 g) was added for the water wash. Some solvent (1409 g) was stripped, and the resulting organic mixture was solvent swapped with MDU recycle BCM. With the heating bath at 98° C., 611 g of BCM was added through the reactor headspace. When no more distilled solvent was collected (430 g of distillate),840 g of BCM was added. Again, when no more distillate was collected (773 g of distillate), 384 g of BCM was added. A final 298 g of distillate was collected. The residue was then dissolved in 1398 g of BCM. The mixture was dried by distilling off 228 g of solvent. The final composition of the APS solution was: 53.9% PS, 35.5% BCM, 9.9% DBM, 0.6% cyclohexane, 0.05% tetrahydrofuran, and <5 ppm water. For the LOW fraction, the calculated $M_n$ was 800 with 640 observed and PD of 1.1. For the HIGH fraction, the calculated $M_n$ was 4500 with 4740 observed and PD of 1.0. For the polymer as a whole, the $M_n$ was 2900, $M_w$ 4300 and PD 1.5.

EXAMPLE 31

Ultra-Low Mw Anionic Polystyrene

Styrene (1669 g, fed below solvent surface) was polymerized in cyclohexane (580 g) containing tetrahydrofuran (380 g) using a combination of 529.6 g of a 16.9 wt % solution of n-butyllithium in cyclohexane and 440 g of a 15.1 wt % solution of in-butyllithium in cyclohexane. All of the n-butyllithium was charged to the cyclohexane and cooled to 50° C. The styrene feed was started, and after 63 g of styrene was added to the mixture, the tetrahydrofuran feed was started. The tetrahydrofuran was fed at a rate so that it would be completed at a total of 250 g of added styrene (about 30 minutes). The reaction was killed by adding 500 g of water. The mixture was then washed 2×500 mL with water. Some solvent (about 1200 mL) was stripped, and the resulting organic mixture was solvent swapped with pure BCM. With the heating bath at 98° C., a total of 3600 g of BCM was added, in 500 g portions, through the reactor headspace. Additional solvent was added when the rate of distillation began to slow significantly. The residue was then dissolved in 2503 g of BCM. The mixture was dried by distilling off 375 g of solvent. The final composition of the APS solution was: 39.1% PS, 60.8% BCM, 0.07% cyclohexane, 0.04% tetrahydrofuran, and <5 ppm water. The calculated $M_n$ was 620 with 730 observed and PD of 1.3.

EXAMPLE 32

Copolymerization of Octene with Styrene

Octene (200 g) was added to cyclohexane (1480 g) containing 133 g of tetrahydrofuran. The solution was heated to 30° C. and 239 g of a 16.9 wt % n-butyllithium solution in cyclohexane was added. The mixture exothermed about 3° C over 2 minutes. At 15 minutes of reaction time, the styrene feed (1806 g) was started. The styrene was fed over 45 minutes, and the reaction was killed with 50 g of water. An additional 450 g of water wash added for the water wash. The organic phase was placed in an oven at 210° C. for devolatization. The calculated $M_n$ was 3200 with 3330 observed and PD of 1.01.

EXAMPLE 33

Polymerization Using Hexane Solvent

Styrene (1803 g, fed below solvent surface) was polymerized in hexane (1450 g) containing tetrahydrofuran (126 g) using 157 g of a 23.8 wt % solution of n-butyllithium in hexane. The reaction was conducted at about 50° C. with a styrene feed time of 60 minutes. The reaction was killed by adding 500 g of 20% aqueous NaBr. The aqueous phase was removed, and the biphasic organic mixture was heated to about 80° C. During the strip, the mixture was observed to be relatively more foamy than that based on cyclohexane. Some solvent (about 1200 mL) was stripped, and the resulting very viscous organic mixture was placed in an oven for devolatization. The mixture foamed out of the pan during the devolatization. The calculated $M_n$ was 3080 with 3230 observed and PD of 1.03.

EXAMPLE 34

Filtration Using Celite 535® in Apparatus 2

Using the procedure in Example 18,1800 g of styrene was reacted with 224 g of n-butyllithium solution in 1450 g of cyclohexane containing 126 g of tetrahydrofuran. The styrene feed time was 40 minutes, and the cook time was 10 minutes. The mixture was killed with 31 g of water. To the resulting mixture was added 70 g of Celite 535 filter aid (~2 wt %). The mixture was stirred and transferred to a 1-gallon milk can. The a 20-μm screen was precoated with about 10 g of Celite 535 in the pressure filter funnel. The organic mixture was forced through the screen at a nitrogen pressure of about 37 psi. The mixture flowed only very slowly through the filter and plugged in about 20 minutes. The screen was changed to 50-μm, and the filtration repeated. The initial flow was improved, but it took over 4 hours to filter less than 1 gallon of mixture.

EXAMPLE 35

Solvent Recycle

Styrene (1800 g, fed below solvent surface) was polymerized in cyclohexane (1490 g) containing tetrahydrofuran (130 g) using 224 g of a 15.1 wt % solution of n-butyllithium in cyclohexane. The reaction was killed by adding 500 g of 30% NaBr (460 g recovered). The mixture was transferred to another flask and heated to 210° C. The recovered solvent (1786 g) was returned to the reactor, and 73 g of solvent was distilled to dry the mixture. The final solvent adjustment was the removal of 252 g of dried mixture and the addition of 40 g of tetrahydrofuran. Styrene (1808 g) was then polymerized with 230 g of n-butyllithium solution. The reaction was killed by adding 300 g of 20% aqueous NaBr. The phase separation was poor, so 92 g of 48% HBr, 100 g of water and40 g of NaBr were added to the mixture (organic was still milky, but 450 g aqueous were recovered). The mixture was transferred to another flask and heated to 210° C. The recovered solvent (1490 g) was returned to the reactor, and 75 g of solvent was distilled to dry the mixture. The final solvent adjustment was the addition of 50 g of cyclohexane and 30 g of tetrahydrofuran. Styrene (1798 g) was then polymerized with 224 g of n-butyllithium solution. The reaction was killed by adding 300 g of 40% aqueous NaBr. Gelatinous solids were observed, so 92 g of 48% HBr were added to the mixture (360 g aqueous was recovered). The mixture was transferred to another flask a heated to 210° C. The recovered solvent (1500 g) was returned to the reactor and 75 g of solvent was distilled to dry the mixture. The final solvent adjustment was the addition of 50 g of cyclohexane and 30 g of tetrahydrofuran. Styrene (1800 g) was then polymerized with 225 g of n-butyllithium solution. The reaction was killed by adding 500 g of 40% aqueous NaBr. The mixture was transferred to another flask and heated to 210° C. The resulting organic mixture was solvent swapped with MDU recycle BCM, and a portion of the solution was used for bromination.

It is to be understood that the components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A batch process for producing anionic styrenic polymer, which process comprises:
   A) charging a liquid saturated hydrocarbon diluent and an ether promoter into a reactor; and then
   B) either
      1) (i) charging a saturated hydrocarbon solution of organolithium initiator into the reactor, in an amount to provide in the range of about 1 to about 10 mol % of organolithium initiator based on the total amount of a styrenic monomer to be added followed by (ii) the controlled addition of the styrenic monomer such that the temperature of the resultant reaction mixture is maintained at or below about 55° C.; or
      2) concurrently feeding separate feeds f(i) a styrenic monomer and (ii) a saturated hydrocarbon solution of organolithium initiator into the reactor, the feeds being maintained at rates to provide for the addition of an amount of organolithium initiator in the range of about 1 to about 10 mol % based on the total amount of styrenic monomer to be added, the temperature of the resultant reaction mixture being maintained at or below about 55° C. and feed (ii) being of a shorter duration than feed (i).

2. A process according to claim 1 wherein option 2 of step (B) is carried out, and wherein the feeds are maintained to provide in the range of about 2 to about 5 mol % of organolithium initiator based on the total amount of the styrenic monomer.

3. A process according to claim 2 wherein option 2 of step (B) is carried out and the feeds are maintained to provide in the range of about 2.5 to about 3.5 mol % of organolithium initiator based on the total amount of the styrenic monomer.

4. A process according to claim 1 wherein the liquid saturated hydrocarbon is one or more liquid saturated cycloaliphatic hydrocarbons.

5. A process according to claim 4 wherein the ether promoter is a saturated cyclic or acyclic monoether having in the range of 4 to about 8 carbon atoms in the molecule.

6. A process according to claim 5 wherein the monoether is tetrahydrofuran, methyltetrahydrofuran or dimethyltetrahydrofuran, or a mixture of any two or more of these.

7. A process according to claim 6 wherein the monoether consists essentially of tetrahydrofuran.

8. A process according to claim 5 wherein the monoether consists essentially of an alkyl tert-butyl ether.

9. A process according to claim 8 wherein the monoether consists essentially of methyl tert-butyl ether.

10. A process according to claim 1 wherein the styrenic monomer consists essentially of styrene, and wherein the organolithium initiator consists essentially of an alkyllithium compound.

11. A process according to claim 10 wherein the alkyllithium consists essentially of n-butyllithium and the ether promoter consists essentially of tetrahydrofuran, and wherein the mole ratio of tetrahydrofuran to n-butyllithium used in the process is at least about 2:1.

12. A process according to claim 11 wherein the mole ratio of tetrahydrofuran to n-butyllithium used in the process is about 3:1.

13. A process according to claim 12 wherein the polydispersity index of the resulting polymer in the final solution is about 1.2 or less.

14. A process according to claim 10 wherein the alkyllithium consists essentially of n-butyllithium and the ether promoter is methyl tert-butyl ether, and wherein the mol ratio of methyl tert-butyl ether to n-butyllithium is in the range of about 2:1 to about 3:1.

15. A process according to claim 1 wherein the polydispersity index of the resulting polymer in the final solution is about 1.2 or less.

16. A process according to claim 1 wherein option 2 of step (B) is carried out and wherein the process further comprises the step of prefeeding a portion of the styrenic monomer after step (A) and prior to step (B).

17. A process according to claim 16 wherein the prefer portion is about 1% by weight of the total amount of styrenic monomer.

18. A process according to claim 1 wherein the process is carried out so as to form anionic styrenic polymer having a number average molecular weight in the range of about 1000 to about 10,000.

19. A process according to claim 1 wherein the amount of said saturated hydrocarbon diluent and said ether promoter is sufficient to cause the resultant reaction mixture to contain about 5 to about 70 wt % of styrenic polymer upon termination of the styrene addition or feed.

20. A process according to claim 19 wherein the amount of said saturated hydrocarbon diluent and said ether promoter is sufficient to cause the resultant reaction mixture to contain about 40 to about 60 wt % of styrenic polymer upon termination of the styrene addition or feed.

21. A process according to claim 1 wherein option 2 of step (B) is carried out and wherein the concurrent feeds of (B) proceed for a period of time in the range of about 2 to about 10 minutes, and the resulting reaction mixture of(B) is maintained at or below 55° C., and the styrenic monomer feed continues for a period of time not exceeding about 2 hours, measured from initiation of the concurrent feeds of (B).

22. A process according to claim 1 wherein option 2 of step (B) is carried out and wherein the liquid saturated hydrocarbon diluent is cyclohexane, the ether promoter is tetrahydrofuran, the organolithium initiator is n-butyllithium, the styrenic monomer is styrene, and the concurrent feeds of (B) proceed for a period of time in the range of about 2 to about 10 minutes, the resulting reaction mixture of (B) is maintained at or below 55° C., and the styrene monomer feed continues for a period of time not exceeding about 2 hours, measured from initiation of the concurrent feeds of (B).

23. A process according to claim 1 wherein option 2 of step (B) is carried out and wherein the liquid saturated hydrocarbon diluent is cyclohexane, the ether promoter is methyl tert-butyl ether, the organolithium initiator is n-butyllithium, the styrenic monomer is styrene, the concurrent feeds of (B) proceed for a period of time in the range of about 2 to about 10 minutes, the resulting reaction mixture of (B) is maintained at or below 55° C., and the styrenic monomer feed continues for a period of time not exceeding about 5 hours, measured from initiation of the concurrent feeds of (B).

24. A batch process for producing anionic styrenic polymer, which process comprises:

charging cyclohexane and an ether promoter into a reactor; and then prefeeding about 1 percent by weight of the total amount of styrene monomer to the reactor; and then concurrently feeding separate feeds of (i) the remaining styrene monomer and (ii) a saturated hydrocarbon solution of organolithium initiator into the reactor, said feeds being maintained over a period of time in the range of about 2 to about 10 minutes and at rates to provide for the addition of an amout of organolithium initiator in the range of about 2.5 to about 3.5 mol % based on the total amount of the styrene monomer, and the temperature of the resultant reaction mixture being maintained at or below about 55° C., and the styrene monomer being fed for a period of time not to exceed about 2 hours measured from initiation of the feeds (i) and (ii);

so as to form an anionic styrenic polymer having a polydispersity index of about 1.2 or less.

25. A process according to claim 24, wherein the ether promoter consists essentially of tetrahydrofuran and the organolithium initiator consists essentially of n-butyllithium, and wherein the mole ratio of tetrahydrofuran to n-butyllithium used in the process is at least about 2:1.

26. A process according to claim 25, wherein the mole ratio of tetrahydrofuran to n-butyllithium used in the process is about 3:1.

27. A process according to claim 24 further comprising quenching the resultant reaction mixture with water, separating an anionic styrene polymer solution from the quenched mixture, and devolatizing the polymer solution of at least a portion of any diluent and ether promoter remaining therein.

* * * * *

UNITED STATES PATENT AND TRADEMARK OFFICE
Certificate

Patent No. 6,657,028 B1                                                                Patented: December 2, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: J. Todd Aplin, Baton Rouge, LA (US); Charles H. Kolich, Baton Rouge, LA (US); W. Dirk Klobucar, Baton Rouge, LA (US); Kimberly A. Maxwell, Baton Rouge, LA (US); Ronny W. Lin, Baton Rouge, LA (US); Gerald M. Sulzer, Baton Rouge, LA (US); and John F. Balhoff, Baton Rouge, LA (US).

Signed and Sealed this Ninth Day of January 2007.

DAVID W. WU
*Supervisory Patent Examiner*
Art Unit 1713